United States Patent

Mayer et al.

[15] 3,642,264
[45] Feb. 15, 1972

[54] PRODUCTION OF HIGH-DENSITY, DEAD-BURNED MAGNESIA IN A SHAFT KILN

[72] Inventors: Raymond P. Mayer; Ivan M. Thompson; Walter P. Zbojniewicz, all of Ludington, Mich.

[73] Assignee: The Dow Chemical Company, Midland, Mich.

[22] Filed: Mar. 2, 1970

[21] Appl. No.: 15,901

[52] U.S. Cl. ................................................................. 263/52
[51] Int. Cl. .......................................................... C04b 35/04
[58] Field of Search ................................... 263/29, 52, 53

[56] References Cited

UNITED STATES PATENTS 3,280,228  10/1966  Pack et al. ................................. 263/53
3,221,082  11/1965  Leatham et al. ......................... 263/53

Primary Examiner—John J. Camby
Attorney—Griswold and Burdick, Stephen S. Grace and William R. Norris

[57] ABSTRACT

Dead-burned magnesia density is improved by controlling the heating in a shaft kiln to a rate of less than about 30° C. per minute through a temperature range of from about 1,100° to 1,700° C.

3 Claims, No Drawings

PRODUCTION OF HIGH-DENSITY, DEAD-BURNED MAGNESIA IN A SHAFT KILN

BACKGROUND OF THE INVENTION

The present invention relates to the production of dead-burned magnesia in a shaft kiln. Conventionally, magnesia (MgO), obtained for example by calcining magnesium hydroxide or magnesium carbonate, is compacted into briquettes and fed into the top of a gas-fired shaft kiln. The briquettes pass through a preheat zone, e.g., room temperature to 1,100° C.; a hot zone, e.g., 1,100° C. to dead-burning temperature (in excess of 1,700° C.); and a cooling zone. The dead-burned briquettes are continuously removed from the bottom of the kiln.

One particular use of the dead-burned magnesia is in making basic refractory products, e.g., periclase brick. A highly desirable property of the dead-burned magnesia for this application is high bulk density. This will in turn produce a high density refractory product.

An object of the present invention is to provide a method of improving the density of dead-burned magnesia prepared in a shaft kiln.

THE INVENTION

Applicants have discovered that the density of the dead-burned magnesia can be improved by heating the magnesia at a rate of less than about 30° C. per minute through a temperature range of from about 1,100° C. to 1,700° C. Heretofore, in shaft kiln operation, the heating rate through this hot zone has been substantially higher, e.g., in excess of 100° C. per minute. However, if heating is carried out in accordance with the present invention, substantial improvement in product bulk density will be achieved.

The prescribed heating rate can of course be obtained by several means, e.g., control of (1) the briquette feed rate through the critical temperature range, (2) the external heating means (usually gas-fired jets), or (3) the rate and temperature of gases passing up through the shaft kiln.

In the practice of the present invention, the magnesia briquettes are fed into the shaft kiln and heated in conventional manner to about 1,100° C. The rate of heating up to this temperature is not critical with respect to product bulk density. The briquettes can, for example, be heated at a rate of less than 200° F. per minute to 2,000° F. (1,093° C.) in accordance with Leatham et al. (U.S. Pat. No. 3,221,082) to reduce spalling and fines production.

The heating rate from 1,100° C. to 1,700° C. is then controlled to less than about 30° C. per minute to improve product density.

Where the dead burning temperature is in excess of 1,700° C., the critical heating rate can be employed up to the actual dead-burning temperature. Preferably the magnesia is heated at a rate of 20° C./minute or less. In general, the lower the heating rate through this critical temperature range, the higher the product density.

EXAMPLES

Several 1⅛-inch-diameter briquettes of calcined Mg(OH)$_2$ were heated in a gas fired furnace to 1,400° C. at a rate of about 5–6° C./minute. Samples of the briquettes were then heated from 1,400° to 1,700° C. at various rates.

The samples were cooled and then reheated to 1,700° C., to ensure that testing was done with full grain development and maximum density for all samples, in accordance with the following heat schedule: with natural gas-air flame, heat to 500° C. in 1 hour, from 500° to 800° C. in 2 hours, and from 800° to 1,000° C. in one-half hour; then with natural gas-oxygen flame, heat from 1,000° to 1,700° C. in 2 hours and hold for 1 hour.

The briquettes were cooled and tested for bulk density by a mercury-displacement method. This method consists of measuring the volume of mercury displaced by a volume of solids. About 2.5 grams of a crushed and screened sample briquette (−10 to +16 mesh size) were weighed into a vessel of known volume. After evacuating the vessel and sample to a pressure of >100 microns, mercury is admitted until a pressure of 9.8 lb./in.$^2$ is obtained. The weight of mercury added is determined and converted to volume. This volume is subtracted from the vessel volume to give the sample volume. The bulk density is the sample weight divided by the sample volume.

The Table below shows the heating rate versus density of the magnesia.

TABLE I

| Heating Rate—°C./min. 1,400°–1,700° C. | Density—g./cc. |
| --- | --- |
| 5.8 | 3.48 |
| 10 | 3.43 |
| 20 | 3.38 |
| 30 | 3.33 |
| 57 | 3.31 |
| 95 | 3.33 |
| 138 | 3.29 |
| >170 | 3.20 |

Substantial improvement in dead-burned magnesia density is achieved by heating at a rate of less than about 30° C./min. Up until that point lowering the heating rate had little effect on the resultant density.

Although this particular example demonstrates the critical heating rate through a temperature range of 1,400° to 1,700° C., it has been observed that such heating rate is beneficial with other magnesia samples from a temperature of about 1,100° C., i.e., heating at rates greater than 30° C./min. above a temperature of about 1,100° C. and beyond produces a relatively low-density product. For example, magnesia briquettes, produced from another calcined Mg(OH)$_2$, were fired to various temperatures at a rate in excess of 300° C./min. Another portion was fired to 1,700° C. at about 5–6° C./min. All samples were cooled and refired (slow rate) in accordance with the schedule of the previous example. The bulk density of the slow-fired sample was about 3.40 g./cc. A sample heated to 1,000° C. had a density of 3.38 g./cc., about 0.6 percent reduction. Thus heating rapidly to 1,000° C. did not affect density substantially since the sample was not subjected to rapid firing above about 1,100° C. However, samples rapidly heated to 1,200° C. and 1,400° C. had densities of 3.35 g./cc., about 1.5 percent reduction, and 3.30 g./cc., about 3 percent reduction, respectively. These samples were adversely affected by rapid firing from 1,000° to 1,200° C. and 1,400° C. respectively.

Table II presents results of actual experiments or results predicted by actual tests regarding the relationship of heating rate, temperature range and bulk density.

TABLE II

| Sample | Heating Rate °C./min. Room Temp.–1,100° C. | Heating Rate °C./min. 1,100°–1,700° C. | Bulk Density g./cc. |
| --- | --- | --- | --- |
| A | 5 | 5.8 | 3.48 |
| B | 41 | 5.8 | 3.49 |
| C | 41 | >170 | 3.22 |
| D | >170 | 5.8 | 3.49 |
| E | >170 | >170 | 3.23 |

Product bulk density can be substantially improved by controlling the heating rate to less than 30° C./min. through a temperature range of from 1,100° to 1,700° C.

What is claimed is:

1. In the method of dead-burning magnesia in a shaft kiln to produce magnesium oxide, the improvement which comprises heating the magnesia at a rate of less than about 30° C./minute through a temperature range of from about 1,100° to 1,700° C., whereby the density of the magnesium oxide product is increased.

2. The improvement of claim 1 wherein the heating rate does not exceed 20° C./minute.

3. The improvement of claim 1 wherein the magnesia is derived from magnesium hydroxide and the magnesia is heated at the specified rate through a temperature range of from about 1,400° to 1,700° C.

* * * * *